US 12,468,041 B2

(12) United States Patent
Gipson (10) Patent No.: US 12,468,041 B2
(45) Date of Patent: Nov. 11, 2025

(54) SYSTEM, METHOD, AND COMPONENTS PROVIDING COMPRESSIVE ACTIVE RANGE SAMPLING

(71) Applicants: VOLKSWAGEN AKTIENGESELLSCHAFT, Wolfsburg (DE); AUDI AG, Ingolstadt (DE); DR. ING. H.C.F. PORSCHE AKTIENGESELLSCHAFT, Stuttgart (DE)

(72) Inventor: Jerramy Lee Gipson, Willits, CA (US)

(73) Assignees: VOLKSWAGEN AKTIENGESELLSCHAFT (DE); AUDI AG (DE); DR. ING. H.C.F. PORSCHE AKTIENGESELLSCHAFT (DE)

(*) Notice: Subject to any disclaimer, the term of this patent is extended or adjusted under 35 U.S.C. 154(b) by 1130 days.

(21) Appl. No.: 17/420,468

(22) PCT Filed: Jan. 3, 2020

(86) PCT No.: PCT/US2020/012166
§ 371 (c)(1),
(2) Date: Jul. 2, 2021

(87) PCT Pub. No.: WO2020/142675
PCT Pub. Date: Jul. 9, 2020

(65) Prior Publication Data
US 2022/0082701 A1    Mar. 17, 2022

Related U.S. Application Data

(60) Provisional application No. 62/787,934, filed on Jan. 3, 2019.

(51) Int. Cl.
*G01S 17/931* (2020.01)
*G01S 7/481* (2006.01)
*G01S 17/58* (2006.01)

(52) U.S. Cl.
CPC .......... *G01S 17/931* (2020.01); *G01S 7/4815* (2013.01); *G01S 7/4817* (2013.01); *G01S 17/58* (2013.01)

(58) Field of Classification Search
CPC .... G01S 17/931; G01S 7/4815; G01S 7/4817; G01S 17/42; G01S 17/58; G01S 17/89
See application file for complete search history.

(56) References Cited

U.S. PATENT DOCUMENTS 5,028,802 A * 7/1991 Webb ............... H01S 5/423
250/235
5,237,331 A * 8/1993 Henderson ......... G01S 7/4814
356/28

(Continued)

FOREIGN PATENT DOCUMENTS

| CN | 109073757 A | 12/2018 |
|----|----|----|
| EP | 1944721 A2 | 7/2008 |

OTHER PUBLICATIONS

Office Action; Chinese Patent Application No. 202080007890.2; Nov. 21, 2023.

(Continued)

*Primary Examiner* — Isam A Alsomiri
*Assistant Examiner* — Joseph C Fritchman
(74) *Attorney, Agent, or Firm* — BARNES & THORNBURG LLP (57) ABSTRACT

A system, methodologies and components utilizing a random access scanning LiDAR sensor for object detection for use in autonomous and driver assisted transportation vehicles, wherein calculated expected potential range changes determined based on emission of range determining (Continued)

laser pulses are used to schedule subsequent emission of range determining laser pulses such that laser pulse generation and ray sample generation for individual rays with a larger expected potential range change is performed more frequently than laser pulse generation and ray sample generation for individual rays with a smaller expected potential change so as to provide compressive active range scanning.

23 Claims, 3 Drawing Sheets

(56) References Cited

U.S. PATENT DOCUMENTS

| | | | |
|---|---|---|---|
| 5,719,664 A | 2/1998 | Besesty et al. | |
| 9,916,703 B2 | 3/2018 | Levinson et al. | |
| 10,131,446 B1 | 11/2018 | Stambler et al. | |
| 10,761,195 B2 | 9/2020 | Donovan | |
| 2007/0138371 A1* | 6/2007 | Marshall | G01S 17/48 |
| | | | 250/201.3 |
| 2007/0263901 A1* | 11/2007 | Wu | G06V 20/584 |
| | | | 382/104 |
| 2010/0066993 A1 | 3/2010 | Lepere et al. | |
| 2013/0305297 A1* | 11/2013 | Jabara | H04N 21/2146 |
| | | | 725/75 |
| 2015/0025708 A1* | 1/2015 | Anderson | A61B 5/6804 |
| | | | 340/463 |
| 2017/0003392 A1* | 1/2017 | Bartlett | G01S 17/42 |
| 2017/0080886 A1 | 3/2017 | Kuga et al. | |
| 2017/0082735 A1* | 3/2017 | Slobodyanyuk | G01S 17/931 |
| 2018/0180733 A1 | 6/2018 | Smits | |
| 2018/0284278 A1 | 10/2018 | Russell et al. | |
| 2019/0107606 A1* | 4/2019 | Russell | G01S 17/26 |
| 2019/0132709 A1* | 5/2019 | Graefe | H04W 4/46 |
| 2021/0389467 A1* | 12/2021 | Eshel | G01S 7/4804 |

OTHER PUBLICATIONS

Search Report for European Patent Application No. 20736121.3; Jul. 20, 2022.
Search Report and Written Opinion for International Patent Application No. PCT/US2020/012166; Mar. 19, 2020.

* cited by examiner

ND COMPONENTS
SYSTEM, METHOD, AND COMPONENTS PROVIDING COMPRESSIVE ACTIVE RANGE SAMPLING

PRIORITY CLAIM

This patent application is a national phase of International Patent Application No. PCT/US2020/012166, filed 3 Jan. 2020, which claims priority to U.S. Provisional Patent Application No. 62/787,934, filed 3 Jan. 2019, the disclosures of which being incorporated herein by reference in their entireties.

COPYRIGHT

A portion of the disclosure of this patent document contains material which is subject to (copyright or mask work) protection (see code referenced throughout). The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD

Disclosed embodiments relate to solutions for resolving technical problems impeding the use of random access scanning LiDAR sensors, in particular, for object detection for use in autonomous and driver assisted transportation vehicles.

BACKGROUND

Scanning LiDAR sensors which are entering the market provide some capability of random access scanning (as opposed to using fixed scan patterns, such as with a Velodyne VLP16). For instance, LiDAR sensors which employ a Micro-Electro-Mechanical System (MEMS) mirror to direct a laser pulse (such as sensors by AEye, Inc. of Pleasanton, CA), allow the beam to be steered in any complex path (subject to the electro-mechanical constraints of the scanning mirror(s), and charging time for the pulsing laser), such that the sensor can be considered as a semi-random access system. As another example, laser emitters comprised of a large array of thousands of micro-lasers (such as those employed by Sense Photonics) allow for the possibility of a truly random access scanning LiDAR sensor in the future; however, presently, such sensors are used only as a flash LiDAR, where all lasers pulse at once.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

Disclosed embodiments address technical problems impeding the use of random access scanning LiDAR sensors, in particular, for object detection for use in autonomous and driver assisted transportation vehicles.

Disclosed embodiments provide a system, methodologies and components utilizing a random access scanning LiDAR sensor for object detection for use in autonomous and driver assisted transportation vehicles, wherein calculated expected potential range changes based on emission of range determining laser pulses are used to schedule subsequent emission of range determining laser pulses such that laser pulse generation and ray sample generation for individual rays with a larger expected potential range change is performed more frequently than laser pulse generation and ray sample generation for individual rays with a smaller expected potential change, so as to provide compressive active range scanning.

Disclosed embodiments maximize information throughput in a dynamic scene, thereby providing range samples which have the highest likelihood of having changed the most to effectively predict and identify scene areas with the most dynamic content.

BRIEF DESCRIPTION OF FIGURES

The detailed description particularly refers to the accompanying figure(s) in which.

DETAILED DESCRIPTION

The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the present invention.

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

Disclosed embodiments address technical problems impeding the use of random access scanning LiDAR sensors, in particular, for object detection for use in autonomous and driver assisted transportation vehicles.

Random access scanning LiDAR sensors could provide a great benefit to sensing and perception systems in that less total energy is required to gather the most important information (as opposed to pulsing the laser for every angle in the scene, at the maximum rate possible). Additionally, use of random access scanning LiDAR sensors could reduce the latency for information-rich samples, since samples which would provide no new information content can be skipped or delayed.

However, a key challenge to implementing systems using such random access scanning LiDAR sensors is the associated need for the development of algorithms to make good use of random access scanning. This is because the raw data cannot simply be gathered once in order for algorithms to be developed later while the system is off-line in an office for development. For instance, an algorithm for optimally steering a scan for detecting pedestrians or small objects is difficult if not impossible to develop off-line if the scanning approach used to gather the raw data did not capture any pedestrians or small objects present in the environment that was scanned. Instead, researchers must continuously develop these algorithms with a live system, so as to enable the ability to try various changes to the algorithms to make improvements to the sampling behavior.

This problem is further complicated if a software algorithm is being developed for a moving platform, such a transportation vehicle with assistive and/or autonomous functionality. Conventionally, such development requires researchers to sit in a car all day, debugging, recompiling, and testing software algorithms under development, as the car driver wanders around the city looking for relevant scenes to test against the algorithm. This leads to slow algorithm development by software developers who are often hunched in the back seat of a car with a small monitor and a keyboard balanced on their laps. Additionally, this development paradigm comes at an increased cost and human risk, due to the requirement that the car must be moving on the roadway the entire time that data is being gathered and analyzed to test the software.

Moreover, a software algorithm targeting one use case (e.g., vehicle identification or differentiation), may generate a scan pattern which is useless for another use case (pedestrian detection). Further, development of scanning algorithms for multiple use cases becomes quite cumbersome and labor intensive, if each use case requires a new, separate road trip to find an example of that scenario, particularly while the researchers are developing the software algorithms while on the move.

These challenges create a great hindrance for random access scanning sensors to be adopted by the transportation vehicle market to support assistive and/or autonomous functionality, despite the clear advantage of random access scanning sensors in terms of power savings and latency reduction.

Thus, disclosed embodiments are, in part, implemented using a lower-level generic random-access scanning algorithm, which can provide a high level of information content for dynamic scenes, but which is not specific to any particular use case, but generally useful for most.

Conventionally, there are some fixed scan pattern LiDAR sensors (e.g., those from Velodyne (San Jose, CA), Ouster (San Francisco, CA) and Hesai (Shanghai, China)) that employ non-uniform scan patterns, such that there is a higher point density in regions where there is statistically more important information. For instance, a narrower vertical separation between scan lines may exist around the center of the scan, as compared to the top and bottom, since this increases the angular point density for distant objects near the horizon. Luminar (Palo Alto, CA) and AEVA (Mountain View, CA) also provide for this approach, adding the flexibility to adjust the scan pattern's center, to take into account pitching of the vehicle, or even adjust the spacing between the lines more dynamically. However, solutions for determining how the lines should be optimally sequenced and arranged for a dynamic scene are not provided by these companies.

In at least one embodiment, LiDAR sensors can be capable of some form of random-access scanning, both horizontally as well as vertically. A few active scan modes can be provided with the LIDAR sensors to focus on particular features determined by a camera included in their product. For instance, these work in response to intensity boundaries between regions (i.e., edge detection), or in response to changes of intensity in the image over time (foreground/background detection). These approaches operate based on the expectation that locations in the video stream which are highest in informational content, will strongly correlate with regions where the LiDAR data would be most informative.

Point cloud compression, such as that developed by LizardTech (Seattle, WA), may be utilized to address conventional limitations. Conventional services and algorithms exist to reduce the storage requirements for a point cloud, which has been previously gathered by scans collected while traveling through an area, and combined into a large map. These focus on removing some of the data points where they are most densely clustered, or by approximating regions of the point cloud with function parameters defining surfaces.

However, disclosed embodiments differ from such implementations in that they also address the conventional implementation obstacles for using random access scanning LiDAR sensors by providing compressive active range sampling. More specifically, herein is described an algorithm for scheduling individual rays (spherical coordinates as originating at the sensor), for range determining laser pulses generated by a random access scanning LiDAR sensor. Such a random access scanning LiDAR sensor may be any LiDAR sensor which provides dynamically configurable scan patterns.

To maximize information delivery, an algorithm for generating ray request packets should request rays where the most change from the previous sampling of that ray is expected. Thus, locations where very little change is expected from the previous sample, should have lower priority for scheduling, and be deferred. Accordingly, in general, a given ray (as considered in the reference frame of a sensor), should be re-sampled more quickly based on an increased uncertainty of the likely result; likewise the ray should be re-sampled more slowly (with longer delay), the more certain the result will be.

To further illustrate this relationship, consider a scene which is stationary, where neither the sensor, nor anything in the environment, is moving. Once every possible ray has been sampled, all subsequent ray samples will produce the same range values as before, providing no additional information other than the continued presence of surfaces at the determined ranges.

However, if an object in the scene should move, the rays intersecting the object (and those of the scene background it is newly occluding, as well as those that the moved object has uncovered) will report a different range than was previously sampled. The time span between the two samplings of a ray, and the difference in range, implies a radial velocity of the surface (with the assumption that the same object was hit by both pulses rather than the object having moved into/out of the ray between pulses), such that $$V=|r1-r0|/(t1-t0)=dr/dt$$

For stationary surfaces, assuming t1−t0 is not very small, the radial velocity V will be near 0. For surfaces which are moving towards or away from the sensor, the radial velocity V will have some value differing from 0 by a non-negligible amount. For cases where the ray has transitioned from an object to the background, or vice versa, the radial velocity V will appear quite extreme, at least for a single sample.

Note that all LiDAR sensors exhibit range noise to some degree, such that two range samples of a stationary surface will differ. This range noise is independent of the time between samples, so whether a surface is re-sampled within 0.01 second, or 10 seconds, the variation due to sensor range noise is statistically expected to be the same. This means that in the above formula, the radial velocity V can appear to be quite large, if t1−t0 is sufficiently small, with the noise dominating the apparent velocity signal. For this reason, a minimum re-sampling period may be enforced to guarantee observability of real change in the scene over the range noise which is generated internal to the sensor.

To reduce the effect of internal sensor range noise, a noise tolerant dr value can be used, where $$dr=|r1-r0|+Nr$$

such that values of dr near or below the noise level (Nr) do not have extreme relative differences (considered as a ratio) such as seen in r1−r0, compared to other dr near the noise level. This also guarantees that, even in cases where the exact same range is measured twice, some non-zero signal is present, so that the system does not wait infinitely long before resampling the ray again.

Alternately, a velocity noise term can be used, which guarantees a fairly uniform response for samples with very low delta range (dr), as opposed to a range noise term, which leads to large variance of response for such samples. The value to use for this term depends upon the minimum sampling period and internal range noise of the LiDAR system, but the value can be adjusted in order to create a desirable responsiveness of the overall system.

$$Vn=dr/dt+Nv$$

Also, it must be ensured that some minimum dt is used so that this doesn't approach zero, which would lead to very large apparent V, which would in turn cause sampling for a ray to be "stuck on" (requested at every opportunity). The scheduler of the sensor in sensor firmware guarantees this, for purposes of eye safety. In addition, the round trip transmit delay of any communication protocol prevents dt from actually reaching zero; thus, no additional effort may need to be made in practice. However, for a general system, samples for a given sensor ray should not be generated too close in time to each other, since then their difference will only be comprised of sensor noise.

Once a V value for a given ray has been determined, an estimate of how much the range could be expected to change over some amount of following time can be made by $$D=V*(tc-t1)$$

where tc is the current time, and t1 the last time the ray was sampled.

Note that the use of adding N above (Nr to dr, or Nv to V) is validated here, since, while some portion of N could in reality be added or subtracted to dr to give the actual change in range, what is considered is the *maximum* reasonable change that could be expected; thus, it should be added. Also, this approach ensures that even if [r1−r0] is very nearly zero, eventually its increasing age will cause it to stand out, as its inherent noise will have pushed its expected change to some non-negligible amount.

Therefore, the following represents the largest reasonable distance that a sample could have traveled, in the time since it was last sampled (assuming it is not accelerating):

$$D=(tc-t1)*(|r1-r0|+Nr)/(t1-t0)$$

or, $$D=(tc-t1)*(|r1-r0|/(t1-t0)+NV)$$

The rays with the largest D values represent those which are most likely to produce the largest differences in range values from previous samplings.

Thus, on a periodic basis (as determined by the minimum dt selected), D may be computed for all rays in a grid. These values may then be sorted. A number of the sorted rays with the largest D values may then be requested for the sensor to sample, such that the rate of ray requests approaches the maximum sample rate, which can be returned from the sensor.

For systems where ray requests and responses can be pipelined and overlapped, once a ray has been requested, but before the ray has been sampled and returned, the ray may be marked as being outstanding, and not included in the calculations and sorting of D.

For maximum throughput, there may be some ideal level for number of outstanding requests, which a control loop can be configured to work to maintain by either requesting more or fewer rays in each request packet. Too few outstanding requests risks that the sensor will become idle, or spend a lot of time traveling between widely spaced rays to sample, thereby reducing the output sample rate. Too many outstanding requests creates latency and uncertainty about when rays will finally get sampled, and diminishes the utility of a random-access scanner. By keeping the number of outstanding requests in an ideal range, a good tradeoff between latency and sample rate is achieved.

In at least one embodiment of LIDAR sensors, range samples may be returned in groups, for example, in User Datagram Protocol (UDP) packets. It is not feasible to sort the many thousands of D values (of all rays) every time a UDP packet is received. Instead, they may be calculated and sorted at some more reasonable frequency, such as 25 Hz, with resulting ray requests loaded into a large communication packet for the next 1/25 second frame period.

Once ray samples are returned, values for t and r may be updated for those rays, such that t1=>t0, r1=>r0, tc=>t1, rNew=>r1. The previous values of t0 and r0 may then be discarded.

Fixed scan pattern LiDAR sensors don't react to a dynamic scene, but rather rely upon statistical approaches to define where in the field of view important information is most likely to be seen and what level of resolution is required. This does not allow for good detection of uncommon scenarios (such as low hanging obstacles), and requires full power consumption at all times, to give sufficient point coverage in all areas.

Sensors which provide adjustable scan lines improve things a bit, over a fully fixed scan pattern, but still offer no guarantee that the most important parts of a given scene will be most densely scanned; additionally, the systems still suffer from the challenges mentioned earlier, in that development of algorithms to steer the pattern requires the researcher to work with a live sensor, in the environment of a particular use case, and can be challenging to rigorously qualify that a given approach will yield acceptable result for all scenarios.

An approach of using a camera with computer vision techniques to determine where to actively scan, can lead to the system making false assumptions, such as where there is a moving uniform surface with low contrast (sides of cars), or where illumination in the environment causes changes in the image without a change to the physical structure (shadows of trees, or vehicle headlights). It also strongly relies on data provided by the camera, which is not always reliable. Rain, glare from the sun, and low illumination such as at night, can make the camera nearly useless. Thus, a scanning algorithm dependent on the quality of the camera would likely also become useless at precisely the time when the LiDAR is most needed.

Accordingly, the presently disclosed methodologies do not use the camera, removing dependence on it functioning properly at all times. Rather, disclosed embodiments provide a completely independent approach to determining regions with the most critical information to be sampled.

Conventional point cloud compression requires the full dataset (or a good portion of it) to be gathered first before compression is performed, and doesn't define how an active random access scanner should operate to generate the same compressed point cloud (though they may provide some clues). Also, point cloud compression focuses on creating a map of the static environment, removing dynamic objects entirely, whereas the method shown here focuses on dynamic data the most, to provide the information most relevant to a live autonomous system.

Likewise, conventional event cameras (such as by Prophesee of Paris, France) gather light continuously, such that the timing of when to generate a sample is a deterministic and post-processed function (determined after the photons which contribute to the sample are received).

In a completely different approach, random access sampling with LiDAR requires that it be determined when and at what angle to create a sample, without full knowledge of what has happened since the previous sampling at that location. Random access sampling with LiDAR can only gather data for samples at discrete times by actively pulsing a laser, where the real values between pulses can only be inferred. Thus, it is a much more challenging problem, and operates in an entirely different domain.

Accordingly, disclosed embodiments address technical problems impeding the conventional use of random access scanning LiDAR sensors, in particular, for object detection for use in autonomous and driver assisted transportation vehicles by completely altering the approach to performing the random access scanning. This is fundamentally different than conventional use of LiDAR based random access scanning, which may use the camera embedded in the sensor in order to drive the scan pattern, using either included active modes or custom approaches. This is because there is no analogous approach to generating samples based on continuous input. Thus, even though compression of point clouds, and similarly of video, is wide spread, there is no conventional ability to provide the presently disclosed compressed active scanning.

To illustrate the utility of the presently disclosed embodiments, consider an exemplary disclosed system wherein a random access scanning LIDAR sensor is mounted to a transportation vehicle positioned in a room along with a large monitor, such that observers may see how they are detected. Most LiDAR samples may be directed at people in the crowd (or whatever they are moving around), with a much lower rate of samples being directed to the stationary parts of the room.

Figure 1:
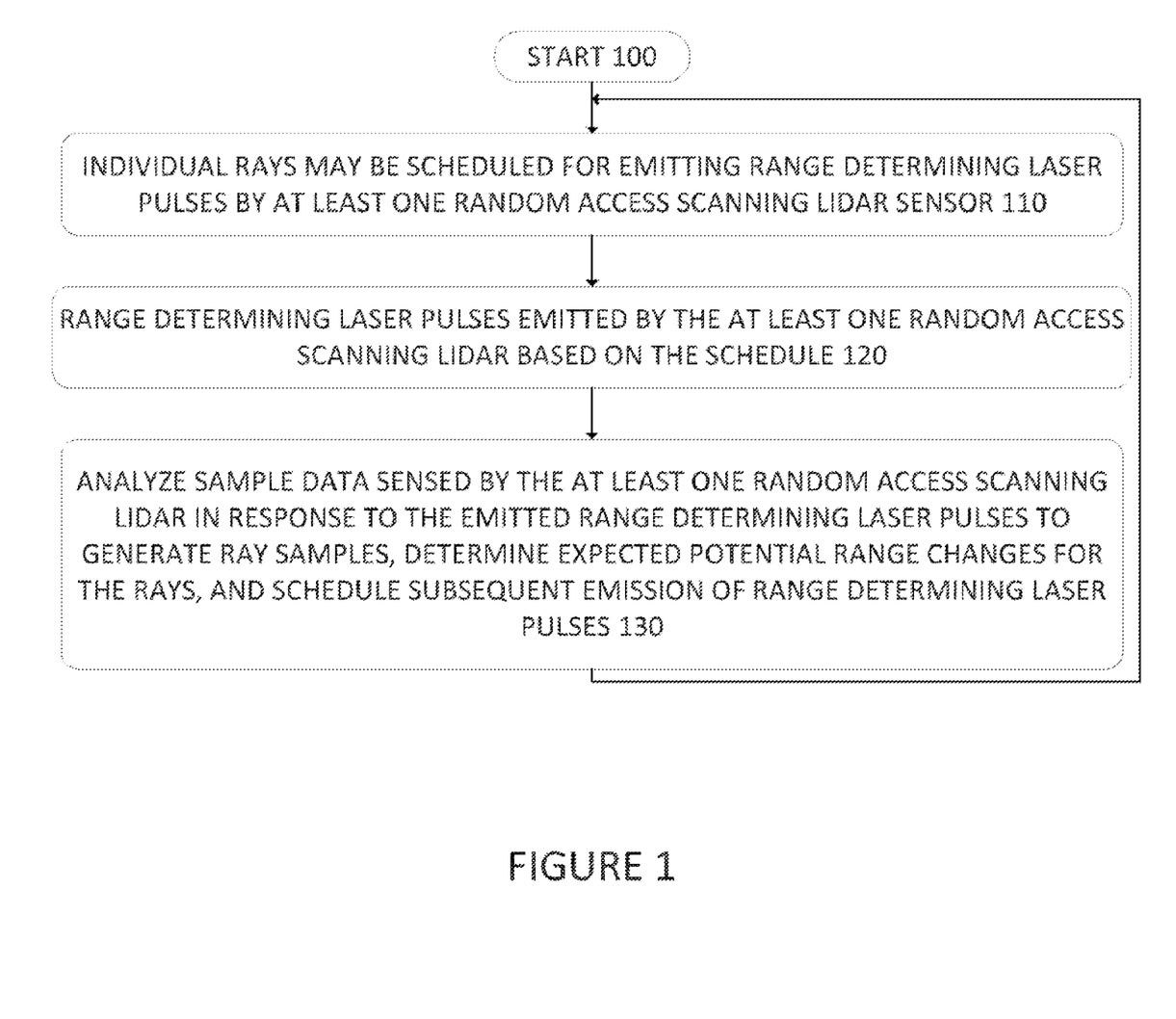
FIG. 1 illustrates an example of software compressive active range sampling provided in accordance with the disclosed embodiments with regard to pedestrian detection.

The following explanation provides a description of software which has been developed and tested, that follows the described algorithm in order to provide an effective demonstration of pedestrian detection. FIG. 1 illustrates an example of the software compressive active range sampling provided in accordance with the disclosed embodiments with regard to pedestrian detection.

For example, as shown with reference to FIG. 1, operations may begin at 100 and control may proceed to 110, at which individual rays may be scheduled for emitting range determining laser pulses by at least one random access scanning LiDAR sensor. This may involve the sensor accepting TCP packets containing a list of rays for sampling, addressed by discrete values (e.g., a sample grid of 308× 150), in order to provide random-access sampling. Additionally, these ray requests may be added into a 2D grid in the sensor's memory, wherein the scheduler of the sensor determines the optimum path to steer the laser beam (or beams) through, in order to service the ray requests in a minimum of time, subject to constraints of eye safety, time to charge the laser between pulses, and the ability of the MEMS mirror to physically rotate over time to achieve the needed angles.

Thereafter, the range determining laser pulses may be emitted by the at least one random access scanning LiDAR based on the schedule at 120. Subsequently, range samples may be returned for processing in groups, for example, in User Datagram Protocol (UDP) packets. Thereafter, at 130, the sample data sensed by the at least one random access scanning LiDAR in response to the emitted range determining laser pulses may be analyzed to generate ray samples, which are then analyzed to determine expected potential range changes for the rays, which are then used to schedule subsequent emission of range determining laser pulses by the at least one random access scanning LiDAR sensor. Thus, it should be understood that, part of this analysis determines the individual rays with the largest expected potential range change from a previous sampling of that ray. Thereafter, the rays with larger expected potential range changes are sampled again sooner, i.e., more frequently over an iterative or periodic basis, than those with smaller expected potential range changes. In this way, a ray for a location where more potential range change is expected is sampled more often than a ray for a location where less change from a previous sampling of that ray is expected, so as to provide compressive active range scanning.

This may be performed in an iterative manner that can take into account the changing content of an image scene as objects move within the image scene and the perspective of the LiDAR sensor(s) move as a result of movement of a transportation vehicle.

Thus, it should be understood that the disclosed embodiments provides an approach that addresses the technical need to continuously gather input data to iteratively alter how the system detects object movement within dynamic scenes sampled by random access scanning LiDAR sensors. This further enables the ability to optimally steer a scan for detecting pedestrians or small objects using live data, so as to enable the ability to try various changes to the algorithms to make improvements to the sampling behavior.

Further, it should be understood that, although illustrated in a flow chart format, the receiving of these ray request packets, and the timing of when the rays are shot (and subsequently assembled into return packets containing sampled data), is asynchronous. The timing of when exactly a desired ray will be sampled is not necessarily known to the user; however, it is generally known within some limited time (such as in under 0.1 second). If a ray is requested twice before it is sampled, the second request may be ignored.

The length of the request lists may be allowed to be variable; however, it may be generally expected that the entire list will be scanned as a frame, before a following list can be processed. Behavior in practice may differ from this implementation; there may be differences in what the response is to a list received before the previous list has been fully scanned and delivered.

While both the length of the lists, as well as how often they are sent, can be arbitrary, no combination of these factors seems to enable more than approximately 50,000 points per second, at least for semi-random lists provided to the sensor used for the disclosed embodiment.

A frame period of 0.1 second provides the best result, considering various tradeoffs, in at least one of the disclosed embodiments. Thus, a list size of 5,000 can be optimum for the sampling approach described in at least one of the embodiments. Thus, corresponding software code could be:

```
const Microseconds RefreshPeriod = 100000;    //10Hz
const int PointsPerSecond = 50000;            //estimated, hopefully can make more soon
const int PointsPerRequest = PointsPerSecond * (Refreshperiod / 1000000.0); //5000
```

As shown in FIG. 1, an aggregation of the latest sample data received for each scan cell may be kept and output at 130 at the same frame rate as the request lists are generated. It should be understood that this relationship is set for output purposes only, and is not a factor in the scanning algorithm.

For each cell, the time and range of the previous two samples may be kept. Also, the last time a refresh of the cell was requested is kept, as well as the radial velocity calculated at 140 and the uncertainty of the cell, the calculated at 150 (explained below). Thus, the software code for this functionality may be:

```
struct RefreshInfo
{
    Microseconds        t0;
    Microseconds        t1;
    Microseconds        requested;
    int16_t             r0; //range in cm.
    int16_t             r1;
    float               velocity;
    float               uncertainty;
};
std::vector< std::vector< RefreshInfo > > m_refreshInfo; //sized as sensor
```

Velocity may be calculated based on the time and range of the last two samples, including a VelocityNoise term, which limits the delay that a cell will tolerate, even if the two samples have the same range. The ideal level of this term may not be defined, though results from the following code seem to work well.

```
VelocityNoise = 0.01;
float deltaTime = (t1−t0) / 1000000.0;
float deltaRange = abs(r1−r0)/100.0;
velocity = deltaRange/deltaTime + VelocityNoise;
```

Uncertainty (which may also be thought of as the potential range change when considering a LiDAR implementation) may be an estimate of how far the surface in the cell could have moved, based on its velocity and time since last being sampled.

uncertainty=velocity*(currentTime−*t*1)/1000000.0;

Thus, it should be understood that, during startup, cells may be given high uncertainty, to force refresh and population of RefreshInfo at.

if ((*t*1==0)||(*t*0==0)||(*t*0==*t*1)) uncertainty= 1000.0; //meters.

Figure 2:
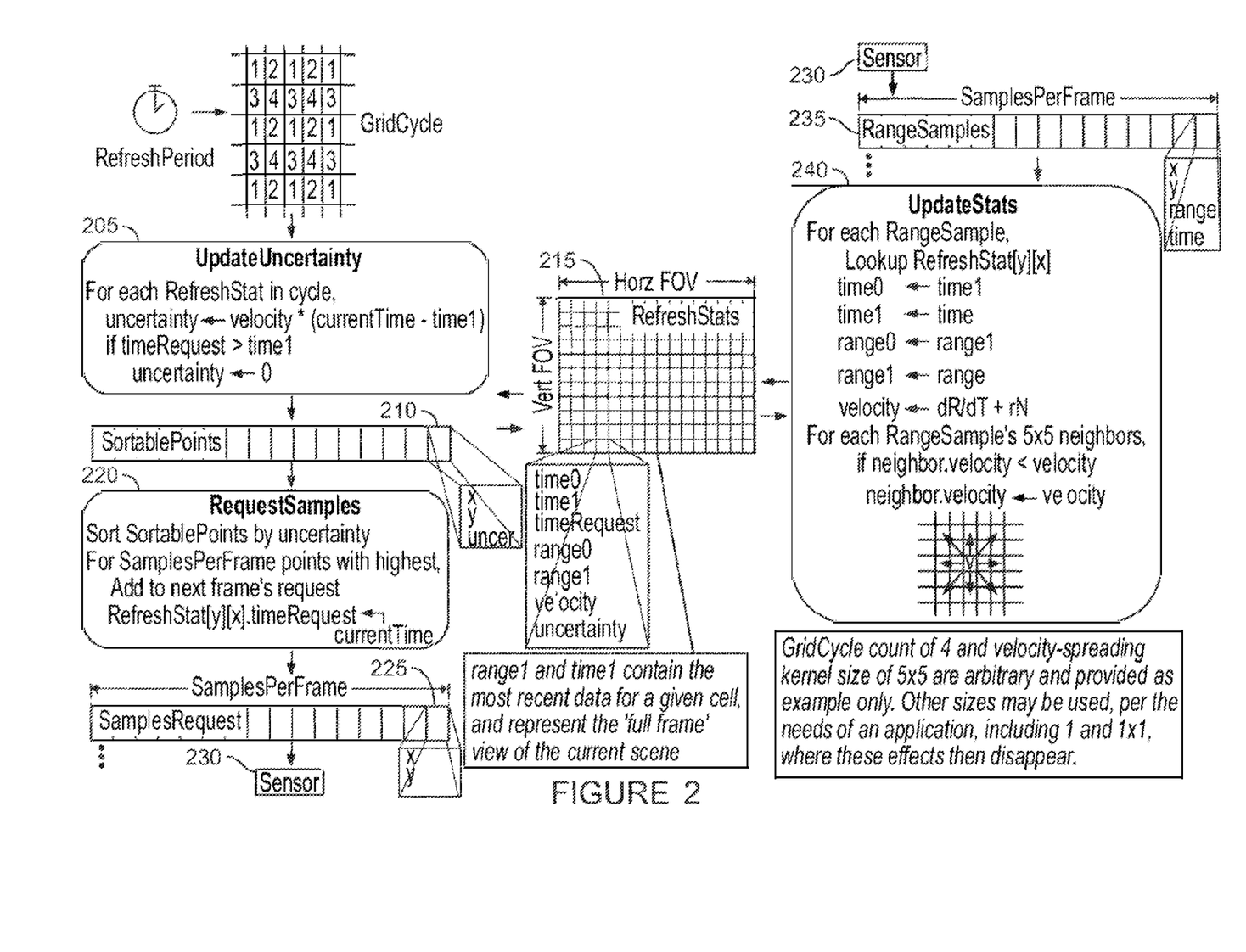
FIG. 2 illustrates an example of a process flow in accordance with at least one disclosed embodiment.

As explained herein with reference to FIG. 2, thereafter, when requested samples are returned from the sensor, the RefreshInfo for the cell is updated to reflect the latest data, and the velocity term is updated as shown above.

```
t0=t1;
r0=r1;
t1=currentTime;
r1=range;
```

By design, cells which have low velocity can take a long time to get refreshed, whereas cells with high velocity will be refreshed after a much shorter delay. However, this can cause spotty refresh of moving objects, since an idle cell will not know that an object has moved into its space. To mitigate this, when a cell is updated, its neighbors may be forced to have at least its expected velocity, as follows:

```
for (int yy = y−2; yy <= y+2; ++yy)
    for (int xx = x−2; xx <= x+2; ++xx)
        if (m_refreshInfo[yy][xx].velocity < velocity)
            m_refreshInfo[yy][xx].velocity = velocity;
```

When it is time to issue a request list, cells are loaded into a list to be sorted by uncertainty as follows:

```
struct SortablePoint
{
    Point<int>          point;
    float               value;
};
std::vector< SortablePoint > ageSortedPoints;
```

For faster sorting, and better spreading of sampling, each refresh period may work with a different cell in a 2×2 patch:

```
static int cycleIndex = 0;
cycleIndex++;
cycleIndex = cycleIndex % 4;
for (int y = ((cycleIndex&1)?1:0); y < LidarFovRow; y+=2)
    for (int x = ((cycleIndex&2)?1:0); x < LidarFovCol; x+=2)
```

Thus, cells update their uncertainty based on the time since the last sample was received, as seen above. Any cells which have a pending request may be skipped, though this only needs to happen if there is some delay in response.

```
if (requested < t1)
{
    m_refreshInfo[y][x].UpdateUncertainty(currentTime);
    SortablePoint point;
    point.value = m_refreshInfo[y][x].uncertainty;
    point.point = Point<int>(x,y);
    ageSortedPoints.push_back(point);
}
```

Cells are sorted, those with highest uncertainty first.

```
auto ageSort = [&](SortablePoint& a, SortablePoint& b)
    (   return a.value > b.value;   );
std::sort(ageSortedPoints.begin( ), ageSortedPoints.end( ), ageSort);
```

The top PointsPerRequest cells which have the highest uncertainty, are loaded into a request list, and sent to the sensor.

```
std::vector<PacketRangePoint> requests;
requests.resize(PointsPerRequest);
for (int i = 0; i < PointsPerRequest; ++i)
{
    requests[i].row = ageSortedPoints[i].point.y;
    requests[i].col = ageSortedPoints[i].point.x;
    m__refreshInfo[y][x].requested = currentTime;
}
```

FIG. 2 illustrates a process flow in accordance with at least one disclosed embodiment. In this example embodiment for compressive active range sampling, a LiDAR can generate a sampling pattern based on uncertainty values for sampled points. The LiDAR can sample points of high uncertainty more often than points that have relatively low uncertainty. An uncertainty value is determined by the change in range for a ray in the time between two samplings (e.g., between a sampling at time 0 ("time0") and a recent sampling at time 1 ("time1"). The uncertainty values for the sampled rays can be stored in a data structure (e.g., RefreshStats).

Based on the update uncertainty operation 205, the uncertainty values and the x- and y-coordinates of the sampled rays are saved onto a sortable points list 210. The sortable points list 210 may then be used to update data stored on the data structure RefreshStats 215. Furthermore, a predefined number of sampled rays from the sortable points list 210 that have the highest uncertainty values is added to a samples request list 225 based on the request samples operation 220. The samples request list 225 is a list of points having x- and y-coordinates for the LiDAR sensor 230 to sample in the next sampling frame.

The LiDAR sensor 230 can then direct its light at the ray angles listed in the samples request list. The LiDAR 230 may be configured to receive the reflected light from the sampled rays to determine one or more of the following for each of the sampled rays: x- and y-coordinates of the sampled point, the intensity of the received light, a time of flight for the light, and the range of the sampled point. The LiDAR 230 stores the received data into a range samples list 235.

As part of the update stats operation 240, the data structure RefreshStats 215 may then be updated by the current data received, including the range for the sampled point, and the time the sampled point was sensed by the LiDAR 230. The x- and y-coordinates of the sampled points may be used to index the data structure, RefreshStats 230 to locate the corresponding cells within the data structure 230 to update. The velocity can also be calculated and updated for each of the sampled points.

In order to sense lateral motion across a frame of samples by the LiDAR, velocity spreading can be implemented such that the calculated velocity for a sampled ray can be spread and saved for neighboring rays. Thereby, the uncertainty in the neighboring rays may increase, causing the LiDAR to sample those neighboring rays to detect any changes at those neighboring rays. By sampling these neighboring rays more often due to the velocity spreading, there can be a higher probability of accurately detecting lateral movement across the frame.

Alternatively, a frame of sampled rays may be collected by the LiDAR. The scanning frame can be partitioned into a grid (also referred to as a "GridCycle") having a plurality of cells, where each cell is indexed by row and column position and corresponds to a sample ray. Thus, a sample ray can be represented by a cell of the grid. In this way, the sample rays can be grouped into an area of 2-cells×2-cells (or another area configuration of N×M cells), with the individual cells within each of the areas can be further identified by an identifier "1", "2", "3", or "4". The identifier acts as a group reference for sampling a particular cell within the various areas of the grid. For instance, all of the "4" cells can be sampled by the LiDAR. Alternatively, only some predefined ones of the "3" cells can be requested for sampling. Furthermore, a mixture of different identifiers can be sampled, e.g., a "1" cell of an area can be sampled, then an adjacent area may have its "2" cell sampled, another adjacent area may have its "3" cell sampled, and so on and so forth. It can be appreciated that the LiDAR can be configured to scan in any predefined or random sampling configuration. This interleaved partitioning of the frame can be used to ensure better spread of samples, and enforce a maximum angular density of ray samples at a given time.

It should be understood that the operations explained herein may be implemented in conjunction with, or under the control of, one or more general purpose computers running software algorithms to provide the presently disclosed functionality and turning those computers into specific purpose computers.

Moreover, those skilled in the art will recognize, upon consideration of the above teachings, that the above exemplary embodiments may be based upon use of one or more programmed processors programmed with a suitable computer program. However, the disclosed embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Moreover, it should be understood that control and cooperation of the above-described components may be provided using software instructions that may be stored in a tangible, non-transitory storage device such as a non-transitory computer readable storage device storing instructions which, when executed on one or more programmed processors, carry out the above-described method operations and resulting functionality. In this case, the term non-transitory is intended to preclude transmitted signals and propagating waves, but not storage devices that are erasable or dependent upon power sources to retain information.

Those skilled in the art will appreciate, upon consideration of the above teachings, that the program operations and processes and associated data used to implement certain of the embodiments described above can be implemented using disc storage as well as other forms of storage devices including, but not limited to non-transitory storage media (where non-transitory is intended only to preclude propagating signals and not signals which are transitory in that they are erased by removal of power or explicit acts of erasure) such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments. Such alternative storage devices should be considered equivalents.

Figure 3:
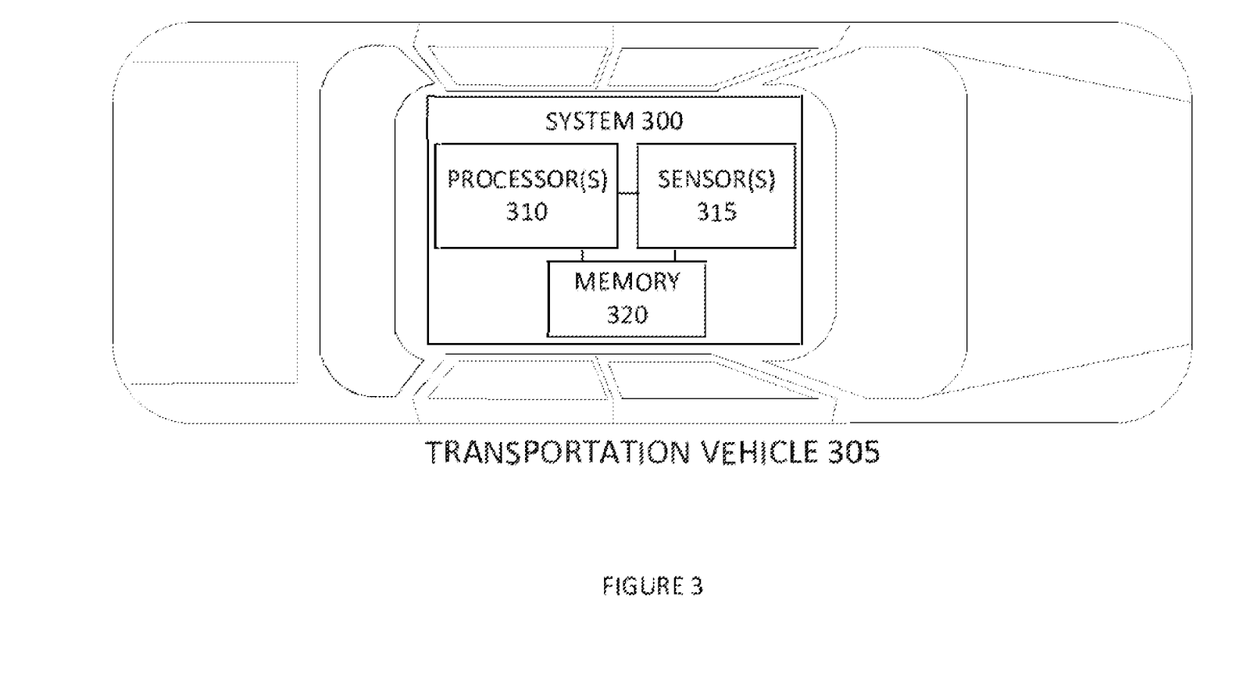
FIG. 3 illustrates an example of constituent components of an assistive/automation system for a transportation vehicle, including components of the disclosed embodiments.

For example, as shown in the block diagram of FIG. 3, disclosed embodiments may be utilized in transportation vehicle equipment that is used to implement assistive and/or autonomous functionality in an assistive/automation system 300 for a transportation vehicle 305. Such a system 300 may include at least one processor 310 coupled to and configured to receive sensor data indicating data regarding the surroundings of the transportation vehicle, for example, data indicating the presence of one or more other vehicles, pedestrians and/or stationary or moving objects within the surroundings. That sensor data may be generated by one or more sensors 315 for performing measurements of object distances around the vehicle, e.g., LiDAR sensors. For example, such sensors 315 may be located, for example, in the rear, the front and the side mirrors, or mounted to the roof, hood, trunk or bumper of a vehicle.

It should be understood that the presently disclosed embodiments may be implemented using the at least one processor 305 which may run software stored in memory 320 for controlling the operations disclosed herein so as to act as a plurality of data processing units or at least one unit that may be capable of processing different data processing tasks. For example, if the sensors 315 are configured to measure more than one distance point for an object, the shape or an approximation of the shape of the object can be detected or approximated. Thus, in at least one implementation in which the sensor is a LiDAR sensor, high resolution information of the surroundings of the vehicle 305 may be collected.

It should also be understood that the system 300 may include hardware and software in the at least one processor 305 or elsewhere to provide the various levels of assistive and/or autonomous functionality described herein. In order to support or provide assistive and/or autonomous functionality, the disclosed embodiments prioritize data gathering and analysis using compressive active sampling, here, range sampling using LiDAR. With this improved sampling (e.g., gathering and analysis), the disclosed embodiments provide technical utility by improving operation of any transportation vehicle equipment for assistive and/or autonomous functionality by improving accuracy, speed of analysis and associated control of vehicle operation.

While certain illustrative embodiments have been described, it is evident that many alternatives, modifications, permutations and variations will become apparent to those skilled in the art in light of the foregoing description. Accordingly, the various embodiments, as set forth above, are intended to be illustrative, not limiting. Various changes may be made without departing from the spirit and scope of the invention.

As explained herein, the disclosed embodiments enable the ability to use differences in range data to determine sample frequency. However, it should further be understood that disclosed embodiments may be utilized with other "error" metrics, such as changes in sample intensity, or a higher order derivative of sampled data (for example, acceleration instead of velocity). Thus, it should be understood that the presently disclosed embodiments have been explained in a way that clearly describes how differences in measurements from what is predicted or expected, may be used to determine how long to wait before a sensor ray is resampled. In other words, the greater the difference or error of a sample to what was predicted, the higher the priority shall be for resampling the ray. Consequently, the greater the difference or error of a sample to what is predicted, the greater the need for less time between samplings, in relation to other rays which do not exhibit such a large error.

Accordingly, it should be understood that, in one implementation example, disclosed herein, this can be applied for range measurements, and the expectation that subsequent samples along the same ray will yield the same range; however, the same essential approach can be applied to other measurement terms and prediction. For example, differences in measured return signal intensity, or in calculated surface reflectivity, or an error term of some combination of these and range, can also be used for determining time to wait before resampling. In addition, the rate of change of these direct measures, can be used to predict the future value of some direct measure; this is because, by knowing a surface's range and radial velocity (both subject to error), it is possible to predict the future range of that surface at a given point in time.

Thus, it should be understood that the disclosed embodiments encompass implementations of the use of an error value between a sample's predicted value, and it's actual value as measured at that time to determine how long to wait before resampling that location. Theoretically speaking, this is based at least in part on the idea that, without preference to scope of time, if a sample's error value relative to the sample's prediction is near the sensor's noise floor, then a longer sampling period will typically be needed, in order to detect any change. Conversely, if a sample's measured value has significantly more error to its prediction, than most other recent samples for other locations, then it should, theoretically, be given priority to be resampled again immediately.

Thus, the scope of the disclosed embodiments includes the aforementioned principle of scheduling, in combination with its application for LiDAR sensors which provide for dynamically adjustable scan patterns. However, it should be understood that the disclosed embodiments provide technical utility by recognizing that a sample period may be inversely proportional to the error from what was expected, whatever measure that may be.

For the purposes of this disclosure, the phrase "autonomous and/or assistive functionality" refers to functionality that enables the partial, full or complete automation of control of various devices and/or systems, including vehicles (where vehicular control ranges and/or encompasses what has presently come to be known as the five levels of driving automation), security systems, airplanes, trains, drones, and warehouse operations. Thus, it should be understood that autonomous and/or assistive functionality refers to operations performed by a vehicle in an automated manner by on-vehicle equipment or the output of alerts, prompts, recommendations or directions to a user, wherein these outputs are generated in an automated manner by on-vehicle equipment. Moreover, autonomous and/or assistive functionality may include driver assistance functionality (level one) wherein on-vehicle equipment assists with, but does not control, steering, braking and/or acceleration, but a driver ultimately controls accelerating, braking, and monitoring of a vehicle surroundings.

It should be understood, therefore, that such autonomous and/or assistive functionality may also include lane departure warning systems which provide a mechanism to warn a driver when a transportation vehicle begins to move out of its lane (unless a turn signal is on in that direction) on freeways and arterial roads. Such systems may include those that warn the driver (Lane Departure Warning) if the vehicle is leaving its lane (visual, audible, and/or vibration warnings) and which warn the driver and, if no action is taken, automatically take steps to ensure the vehicle stays in its lane (Lane Keeping System).

Likewise, autonomous and/or assistive functionality may include partial automation (level two), wherein the transportation vehicle assists on steering or acceleration functions and correspondingly monitoring vehicle surrounding to enable a driver to disengage from some tasks for driving the transportation vehicle. As understood in the automotive industry, partial automation still requires a driver to be ready to assume all tasks for transportation vehicle operation and also to continuously monitor the vehicle surroundings at all times.

Autonomous and/or assistive functionality may include conditional automation (level three), wherein the transportation vehicle equipment is responsible for monitoring the vehicle surroundings and controls steering, braking and acceleration of the vehicle without driver intervention. It should be understood that, at this level and above, the on-vehicle equipment for performing autonomous and/or assistive functionality will be interfacing with or include navigational functionality so that the components have data to determine where the vehicle is to travel. At level three and above, a driver is theoretically permitted to disengage from monitoring vehicle surroundings but may be prompted to take control of the transportation vehicle operation under certain circumstances that may preclude safe operation in a conditional automation mode.

Thus, it should be understood that autonomous and/or assistive functionality may include systems which take over steering, keep the transportation vehicle centered in the lane of traffic.

Likewise, autonomous and/or assistive functionality may include high automation (level four) and complete automation (level five), wherein on-vehicle equipment enable automated steering, braking, and accelerating, in response to monitoring of the surroundings of the vehicle in an automated manner without driver intervention.

Therefore, it should be understood that autonomous and/or assistive functionality may require monitoring of surroundings of a vehicle including the vehicle roadway as well as identification of objects in the surroundings so as to enable safe operation of the vehicle in response to traffic events and navigational directions, wherein that safe operation requires determining when to change lanes, when to change directions, when to change roadways (exit/enter roadways), when and in what order to merge or traverse a roadway junction, and when to use turn signals and other navigational indicators to ensure other vehicles/vehicle drivers are aware of upcoming vehicle maneuvers.

Further, it should be understood that high and full automation may include analysis and consideration of data provided from off-vehicle sources in order to make determinations of whether such levels of automation are safe. For example, autonomous and/or assistive functionality at such levels may involve determining the likelihood of pedestrians in the surroundings of a transportation vehicle, which may involve referencing data indicating whether a present roadway is a highway or parkway. Additionally, autonomous and/or assistive functionality at such levels may involve accessing data indicating whether there is a traffic jam on the present roadway.

With this understanding of potential implementation of on-vehicle sensors for autonomous and/or assistive functionality in mind, presently disclosed systems, components, and methodologies may be provided to improve object detection and tracking in sampled data captured by sensors positioned on a transportation vehicle regarding the surroundings of vehicle by improving sampling (e.g., gathering and analysis) operations of any transportation vehicle equipment for assistive and/or autonomous functionality so as to improve accuracy, speed of analysis and associated control of vehicle operation.

I claim:

1. A system utilizing a random access scanning LiDAR sensor for object detection to implement assistive and/or autonomous driving functionality in a transportation vehicle, the system comprising:
   at least one random access scanning LiDAR sensor; and
   at least one data processor running a software algorithm stored in memory, the software algorithm being configured to control scheduling of individual rays for emission of range determining laser pulses generated by the at least one random access scanning LiDAR sensor to generate ray samples which are then analyzed to calculate expected potential range changes for the rays,
   wherein the calculated expected potential range changes are then used to schedule subsequent emission of range determining laser pulses by the at least one random access scanning LiDAR sensor such that laser pulse generation and ray sample generation for individual rays with a larger expected potential range change is performed more frequently than laser pulse generation and ray sample generation for individual rays with a smaller expected potential change so as to provide compressive active range scanning,
   wherein the compressive active range scanning maximizes information delivery by the at least one data processor running the software algorithm to generate ray request packets that request rays where the most change from a previous sampling of that ray is expected, whereby a given ray, as considered in a reference frame of the at least one random access scanning LiDAR sensor, is re-sampled more quickly based on an increased uncertainty of a likely result, thereby indicating an information-rich sample location.

2. The system of claim 1, wherein the potential range change from the previous sampling is determined based on radial velocity determined for that ray.

3. The system of claim 1, wherein the potential range change is determined based on uncertainty of a sampling having a specific result.

4. The system of claim 1, wherein the at least one random access scanning LiDAR sensor includes a micro-electromechanical system mirror to direct a laser pulse allow the beam to be steered in a complex path.

5. The system of claim 1, wherein the at least one random access scanning LiDAR sensor includes a laser emitter comprised of an array of micro-lasers.

6. The system of claim 1, wherein the at least one LiDAR sensor is configured to perform horizontal random-access scanning.

7. The system of claim 1, wherein the at least one LiDAR sensor is configured to perform vertical random-access scanning.

8. The system of claim 1, wherein the at least one LiDAR sensor is configured to provide dynamically configurable scan patterns.

9. The system of claim 1, wherein, on a periodic basis, the potential range change is computed for all rays in a grid, and the rays with the highest potential range change values are requested for the at least one LiDAR sensor to sample sooner than the other rays in the grid.

10. The system of claim 1, wherein range samples are returned to the at least one processor in User Datagram Protocol packets.

11. The system of claim 1, wherein the potential range change and x- and y-coordinates of the samples are saved in the memory in a sortable list, which is then used to schedule subsequent individual rays for emitting range determining laser pulses generated by the at least one random access scanning LiDAR sensor to generate ray samples.

12. The system of claim 1, wherein lateral motion across a frame of samples is detected by the at least one LiDAR by implementing velocity spreading such that a calculated radial velocity for a sampled point along a sampling ray is spread and saved for neighboring sampling rays such that potential range change in the neighboring sampling rays may be identified to indicate potential range change in a neighborhood of the sampled rays thereby triggering sampling of the neighborhood of the sampled rays to increase the probability of finding lateral movement across the frame of samples.

13. A method for performing random access scanning using at least one LiDAR sensor for object detection to implement assistive and/or autonomous driving functionality in a transportation vehicle, the method comprising:
   scheduling individual rays for emitting range determining laser pulses by at least one random access scanning LiDAR sensor by at least one data processor running a software algorithm stored in memory and generating ray request packets;
   emitting the range determining laser pulses by the at least one random access scanning LiDAR;
   analyzing data sensed in response to the emitted range determining laser pulses to generate ray samples;
   analyzing the generated ray samples to determine expected potential range changes; and
   using the expected potential range changes to schedule subsequent emission of range determining laser pulses by the at least one random access scanning LiDAR sensor such that laser pulse generation and ray sample generation for individual rays with a larger expected potential range change is performed more frequently than laser pulse generation and ray sample generation for individual rays with a smaller expected potential change so as to provide compressive active range scanning,
   wherein the compressive active range scanning maximizes information delivery by at least one data processor running the software algorithm to generate ray request packets that request rays where the most change from a previous sampling of that ray is expected, whereby a given ray, as considered in a reference frame of the at least one random access scanning LiDAR sensor, is re-sampled more quickly based on an increased uncertainty of a likely result, thereby indicating an information-rich sample location.

14. The method of claim 13, wherein the potential range change from the previous sampling is determined based on radial velocity determined for that ray.

15. The method of claim 13, wherein the potential range change is determined based on uncertainty of a sampling having a specific result.

16. The method of claim 13, wherein the at least one LiDAR sensor is configured to perform horizontal random-access scanning.

17. The method of claim 13, wherein the at least one LiDAR sensor is configured to perform vertical random-access scanning.

18. The method of claim 13, wherein the at least one LiDAR sensor is configured to provide dynamically configurable scan patterns.

19. The method of claim 13, wherein, on a periodic basis, the potential range change is computed for all rays in a grid, and the rays with the highest potential range change values are requested for the at least one LiDAR sensor to sample sooner than the other rays in the grid.

20. The method of claim 13, wherein range samples are returned to the at least one processor in User Datagram Protocol packets.

21. The method of claim 13, wherein the potential range change and x- and y-coordinates of the samples are saved in the memory in a sortable list, which is then used to schedule subsequent individual rays for emitting range determining laser pulses generated by the at least one random access scanning LiDAR sensor to generate ray samples.

22. The method of claim 13, wherein lateral motion across a frame of samples is detected by the at least one LiDAR by implementing velocity spreading such that a calculated radial velocity for a sampled point along a sampling array is spread and saved for neighboring sampling rays such that potential range change in the neighboring sampling rays may be identified to indicate potential range change in a neighborhood of the sampled rays thereby triggering sampling of the neighborhood of the sampled rays to increase the probability of finding lateral movement across the frame of samples.

23. A non-transitory computer readable medium including software instructions which, when performed on at least one computer processor, perform a method for performing random access scanning using at least one LiDAR sensor for object detection to implement assistive and/or autonomous driving functionality in a transportation vehicle, the method comprising:
   scheduling individual rays for emitting range determining laser pulses by at least one random access scanning LiDAR sensor by at least one data processor running a software algorithm stored in memory and generating ray request packets;
   emitting the range determining laser pulses by the at least one random access scanning LiDAR;
   analyzing data sensed in response to the emitted range determining laser pulses to generate ray samples;
   analyzing the generated ray samples to determine expected potential range changes; and
   using the expected potential range changes to schedule subsequent emission of range determining laser pulses by the at least one random access scanning LiDAR sensor such that laser pulse generation and ray sample generation for individual rays with a larger expected potential range change is performed more frequently than laser pulse generation and ray sample generation for individual rays with a smaller expected potential change so as to provide compressive active range scanning,
   wherein the compressive active range scanning maximizes information delivery by at least one data processor running the software algorithm to generate ray request packets that request rays where the most change from a previous sampling of that ray is expected, whereby a given ray, as considered in a reference frame of the at least one random access scanning LiDAR sensor, is re-sampled more quickly based on an increased uncertainty of a likely result, thereby indicating an information-rich sample location.

\* \* \* \* \*